Jan. 12, 1965  C. D. WILLSON  3,165,350
TOUR CARS OF STATION WAGON TYPE
Filed Nov. 22, 1961  3 Sheets-Sheet 1
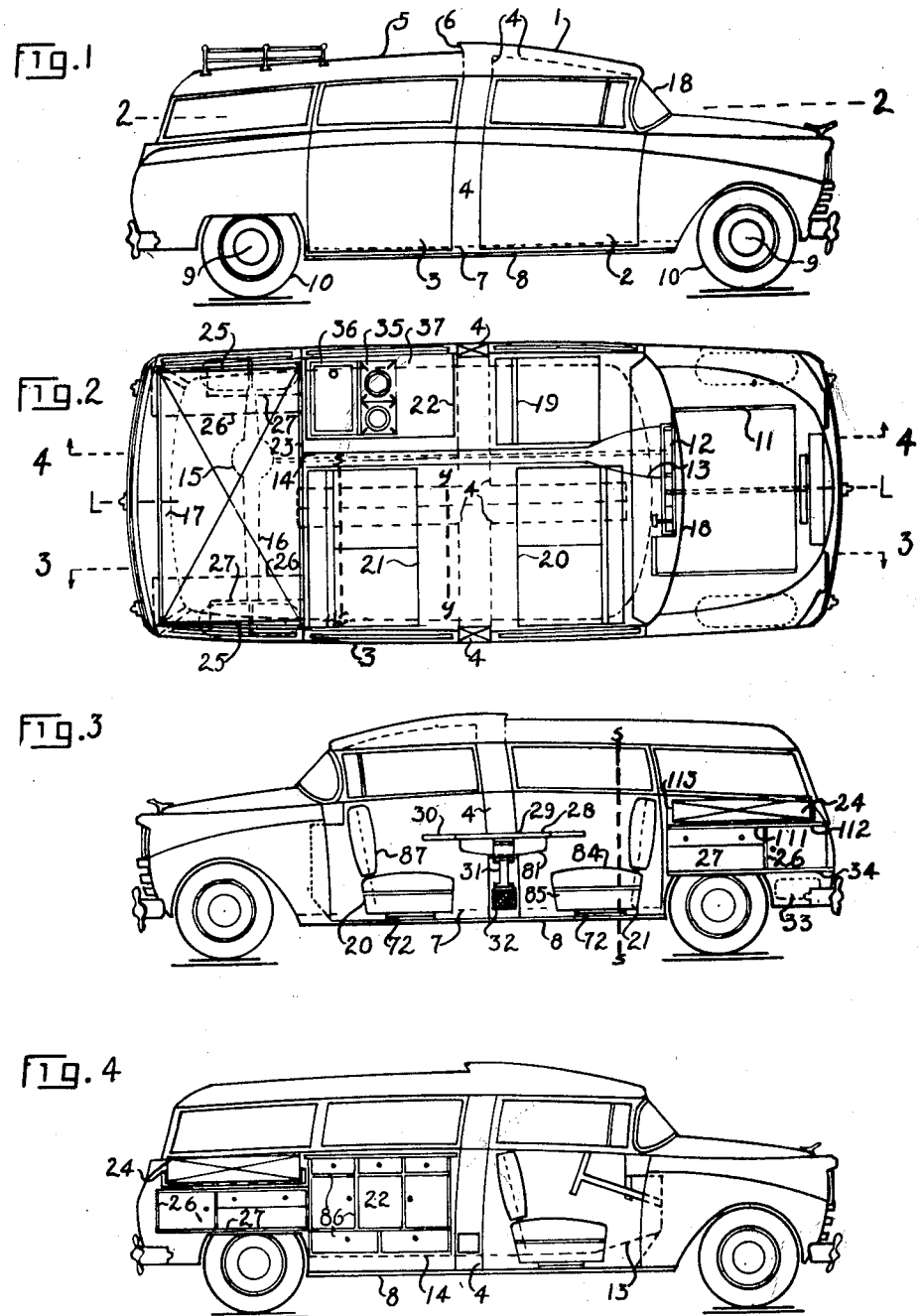

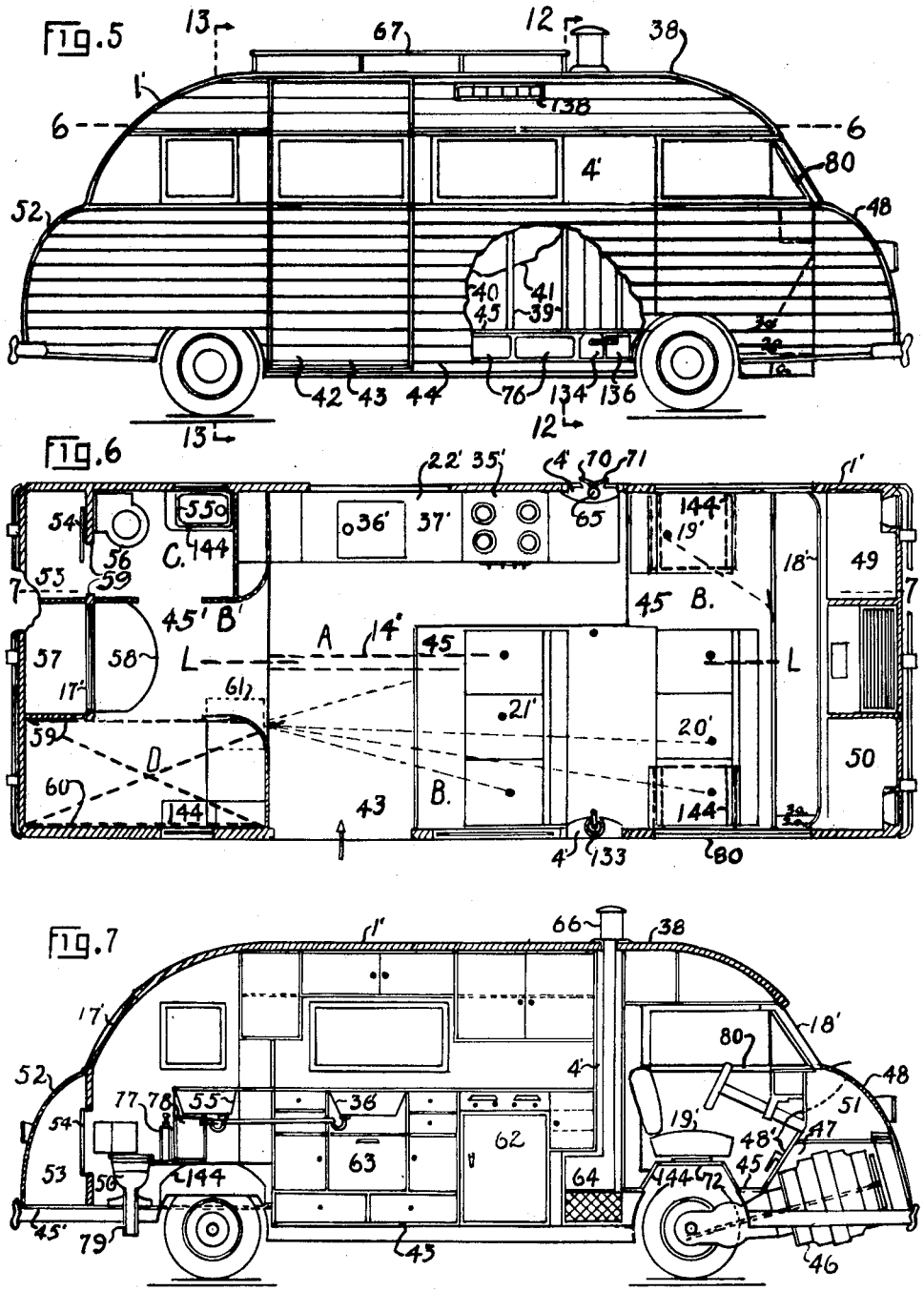

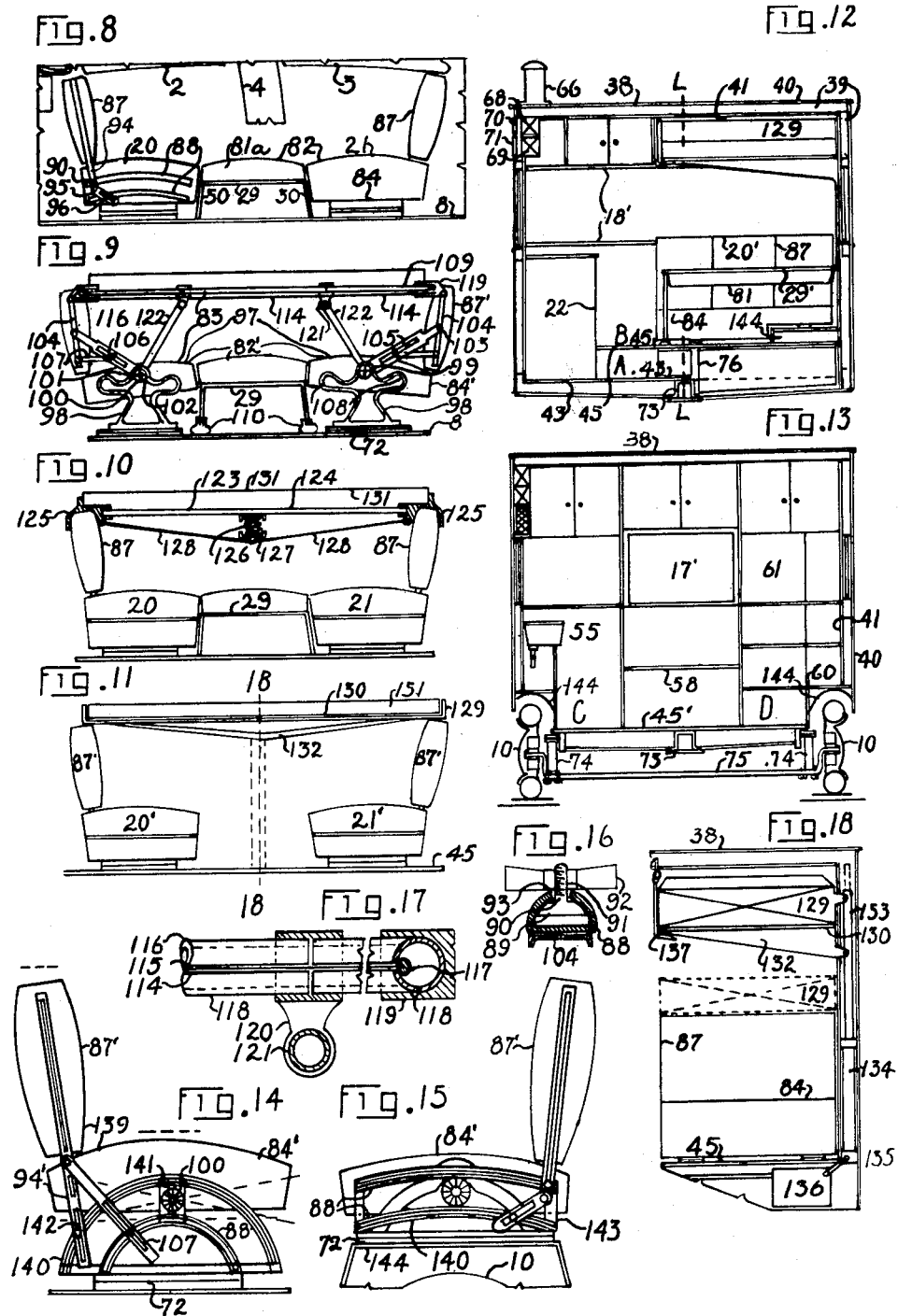

_United States Patent Office_ 3,165,350
Patented Jan. 12, 1965

3,165,350
TOUR CARS OF STATION WAGON TYPE
Corwin D. Willson, 525 Goldengate St., Lake Orion, Mich.
Filed Nov. 22, 1961, Ser. No. 155,246
13 Claims. (Cl. 296—23)

This invention relates to motorcars that meet biological mobile family needs and, more particularly, to tour cars of station wagon type such as are described in the nonelected species of my co-pending application Serial No. 744,419, filed June 25, 1958, and now Patent No. 3,058,-769, and in the elected species of my co-pending abandoned application Serial No. 768,479, of which applications this constitutes a continuation-in-part.

The primary object of the invention is a tour car that provides sleeping accommodations for six passengers at the same time and on opposite sides of the rear axle of a low-slung chassis having the wheelbase of universally accepted types of family cars; this means sleeping accommodations in transit.

Another object of the invention is the improvement of the convertible domestic ensembles described in the parent applications whereby our growing mobility may be better sheltered both on and off the highway, mobile and parked, day and night and in any weather.

Another object of the invention is a tour car which, with little more than its power-drive mechanism supplied by automotive specialists, can be fabricated by such simple means as to invite wide manufacture outside the present automotive industry which presently has ceased to heed any need except the insistence of the upper income groups for an increasingly conspicuous and exclusive product. The present automobile relies on an exterior of sheet metal nearly every piece of which is compound-curved. This requires costly dies and hydraulic presses three stories high, whereas the tour car that can be fabricated at any four-corners in the country avoids compound curves and requires no large body dies or presses in its fabrication any more than does the fabrication of a house-trailer body.

Another object of the invention is a tour car that can be built by the trailer makers for the reason that opposite sides of the body are parallel both vertically and horizontally, in spite of which the body, in longitudinal vertical section, approximates aerodynamic tear-drop shape.

Another object of the invention is a tour car having a low center of gravity in consequence of its use of the backbone body structure described in my Patents Nos. 2,346,123 and 2,525,988, the body having floors at a number of different levels.

Another object of the invention is a tour car that seats a driver and two or more passengers above the tops of the roadwheels, and that seats some of the occupants in the same vertical plane as the axes of the forewheels, but alongside a floor that extends at the general level of said axes.

Another object of the invention is a tour car having greatly increased space for storage ahead of a front bulkhead, behind a back bulkhead, between floors of divers levels and above the passengers, and means utilizing this extra storage space for the greater safety of the passengers in dangerous transit.

These and other novel features and objects of the invention are hereinafter more fully described and claimed and the preferred form of my tour car is shown in the accompanying drawings, in which:

FIG. 1 is a side view of my tour car as a station wagon.
FIG. 2, in part, is a horizontal section below line 2—2 of FIG. 1.
FIG. 3 in part is a vertical section taken on line 3—3 of FIG. 2.
FIG. 4, in part, is a vertical section on line 4—4 of FIG. 2.
FIG. 5 is a tour car having the same wheelbase as the station wagon of FIG. 1 but requiring no costly body dies or presses since nothing more than simple curvature is involved.
FIG. 6, in part, is a horizontal section below line 6—6 of FIG. 5.
FIG. 7, in part, is a vertical section on line 7—7 of FIG. 6.
FIG. 8 shows the dinette components of FIG. 3 combined to form a berth.
FIG. 9 shows an externally sprung double-decker sleeping unit made up from the components of the dinette of FIG. 3, or the dinette components of FIG. 6 when the seat-back of the aft dinette seat is reversed to be forward-facing.
FIG. 10 shows an alternate sleeping unit.
FIG. 11 shows an alternate upper berth.
FIG. 12 is a vertical transverse section taken on line 12—12 of FIG. 5 and shows the upper berth of FIG. 11 after being mechanically elevated to the top of the body where its underside provides a ceiling for the dinette.
FIG. 13, in part, is a vertical transverse section taken on line 13—13 of FIG. 5.
FIG. 14 shows an adjustable seat without the external springing of the seats of FIG. 9.
FIG. 15 is an adjustable seat above a wheelwell as in FIG. 7.
FIG. 16 is a seating detail.
FIG. 17 is a collapsible berth detail.
FIG. 18 is a detail taken on line 18—18 of FIG. 11 showing the lift mechanism for the "push-button" bed.

Before describing the drawings in detail, it should be noted that the cars of FIGS. 1 and 5 have the same wheelbase, the same domestic ensemble ahead of the rear roadwheel axes except that the dinette of FIG. 5 seats more passengers face-to-face; and both cars resemble existing stock types of family cars, FIG. 1 being a station wagon and FIG. 5 being what in Europe is called a "van." Both have front and back doors in the right-hand side of the body. Both have floors extending at different levels. Each has a side door next to an aft roadwheel and opening on a floor of lower level. Due to these similarities, the invention, in greater part, relates to features that both these cars have in common and to other features found only in the preferred FIG. 5 species.

In FIG. 1, body 1 has front doors 2 on opposite sides of the body and only one sidedoor 3 behind the front door 2 in the righthand side of the body. Between front door 2 and rear door 3, wall duct 4 extends upwardly into and across roof-top 5, communicating with comb 6 and thence extending downward in the opposite side of the body. Bottoms of doors 2 and 3 extend slightly below the topside level of frame sill member 7 which may be part of the unit frame of the body. To increase leg and headroom for the seated occupants of the passenger compartment, floor 8 may extend well below the topside of sill member 7. This brings the effective level of the topside of floor 8 well below the axes 9 of fore and aft pairs of roadwheels 10 supplying ground support for body 1.

FIG. 2 shows a body having only two main compartments, the smaller at the front end of the body housing engine 11, and the larger passenger compartment extending behind aftwheels 10 and seating not more than three adult passengers in the same transverse vertical plane. Engine 11 may be centered to one side of longitudinal central axis L—L or may be centered in this axis and be connected by enclosed gear-train or chain-belt 12 with off-center clutch and transmission housing 13 and the means therein (not shown) passing below off-center driveshaft tunnel 14 to the off-center differential housing 15 in rear axle housing 16. The reason for this off-center arrangement is that, in a front-engine car low-slung on its roadwheels, this gets the upward protrusion of the clutch housing and driveshaft tunnel out of the foot and legroom of all the passengers, tunnel 14 passing lengthwise between the driver and the passenger sitting in axis L—L or through the gap between separate seats for the driver and other front seat passengers. The passenger compartment extends from the rear-view glazing or transparency 17 of window or door in the back end of the body to front windshield 18, and floor 8 extends on opposite sides of and below the upper parts of tunnel 14. The structure to be described does not apply exclusively to front-engine cars. The engine may be at the rear, in which case the tunnel 14 may constitute a body backbone according to my above-mentioned patents, or may constitute a housing for driving controls extending from the driver's seat to the rear transmission and power-drive unit, or, as seen in my co-pending application filed Nov. 15, 1961 and now Patent No. 3,097,876, may constitute a heat duct. Next to the left-hand side of the body 1 and facing driving controls below windshield 18 is a seat 19 exclusively for the car driver. Next to seat 19 and extending crosswise of the body in general lateral alignment with seat 19 is front seat 20 for two passengers. Spaced directly behind and parallel with seat 20 is back seat 21 for two passengers and extending between the righthand side of the body and driveshaft tunnel 14; on the opposite side of which and back of driver's seat is dresser 22. The top of tunnel or housing 14 is flattened to provide a narrow walkway extending from clutch or transmission housing 13 to the long side of access 23 of bed 24, opposite ends 25 of which rest on cabinets 26 built around and providing wheelwells 27 for upper portions of aftwheels 10 on opposite sides of body 1. Aftseat 21 is secured to floor 8 by means old in the art as regards the driving seat, and permitting the seat position fore and aft to be changed. This permits seat 21 to be shifted forward to line Y—Y which opens up a passage between bed 24 and temporarily rearward facing seat 21 represented by lines S—S of FIGS. 2 and 3. What this means is, that in order to set up the dinette shown in FIG. 3 having a demountable table 28 of generous size, seat 21 is pushed backwardly into the transverse passage leading to side-door 3 and this passage supplies foot-room for the occupants of seat 21 when the seat-back, by means to be described, is shifted to rearward-facing position for purposes to presently be made clear.

FIG. 3 shows seat 20 in temporarily rearward-facing position and demountable table 28 set up between rearward-facing seat 20 and forward-facing seat 21, the tabletop 29 having hinged drop-leaves 30. One end of tabletop 29 is secured demountably to side of duct 4, or to the right-hand side of the body, and diagonal support member 31 is secured to the opposite end of tabletop 29 and to duct 4 just above opening 32 of the air-conditioning system. Gas tank 33 is in the usual position below floor 34 at the back end of the body, floor 34 being raised above floor 8 alongside passage bounded by line s—s. FIG. 4 shows dresser 22 and cabinet 26 being components of a unit extending from close behind the driver's seat 19 to the rear end of the body next to the left-hand side thereof. From drawings 1–4, it is apparent that body 1 constitutes a typical station wagon except for the absence of one door and seating for one passenger to make room for dresser 22.

In FIG. 2, a two-burner cook-stove 35 and sink 36 are shown with the cover, which normally hides them and serves as part of worktop 37, removed. From the side, as seen in FIG. 4, dresser 22 appears to be only an interiorly divided storage enclosure for travel appurtenances commonly stored in the car trunk or in baggage stored on the car roof or carried in the space below bed 24. Dresser 22 and cabinets 26 may be used for storage only and the housekeeping means 35, 36 may be dispensed with. This point is made to reassure such car-owners as might be appalled at the thought of keeping house in their luxurious cars, even though they accept the idea of housekeeping domesticity in a cabin cruiser as a matter of course. What is being described is a structure that renders the stock station wagon convertible into a cabin-cruiser for land use year-round wherever highways run and in any weather. If FIGS. 1–4 are sensible steps in this direction, why not take a few more and obtain a great deal more room on the same wheelbase?

This is done in FIG. 5 which in floor plan (FIG. 6) and in transverse section (FIGS. 12 and 13) is seen to have opposite sides and the top 38 of the body 1' to have a framework 39 of wood studs and joist to which are attached an outer covering 40, such as of sheet metal, and an inner covering 41 such as a facing for the solidified foam insulation between opposite facings and making of the body shell 1' an effective thermal envelope, which most car bodies are not. The floor plan is rectangular. The cross-sections of FIGS. 12 and 13 are rectangular. Absence of compound curves makes it possible to fabricate such a body with simple tools anywhere. The large motorcar builders cannot by their ponderous methods build such a body cheaply and the more effectively they employ automation to build conventional motorcars, the more impossible it will become for them to build anything for which the annual sale of anything less than 1,000,000 units is assured. Body 38 places the building of "land cruisers" squarely in the hands of the trailer makers who will find only minor changes necessary in stock automotive chassis to power the tour car now to be described.

One entrance is by way of sidedoor 42 of full standing height onto floor 43 which extends right across the body and fore and aft next to the left-hand side of the body at one level A which may or may not be below the topside of sill member 44. On a floor of higher level 45 in Area B is a seat 19' exclusively for driver next to the lefthand side of the body facing driving controls. Transversely aligned with seat 19' is front seat 20' for three passengers extending to the right-hand side of the body. Spaced parallel with and behind seat 20' in area B is back seat 21' for three passengers. With the frontend engine and front-drive hook-up shown in FIG. 7, there need be no protuberance 14 above floor 43. But with a conventional front engine rear-axle drive, the drive-shaft will pass under higher level floor 45 and the only driveshaft tunnel protrusion 14' will then be in area A as seen in FIG. 6 and extending between the back end of dinette floor 45 and the floor of higher level 45' in area B' across the back end of the body, corresponding to the higher level floor 34 in FIG. 3. Here, as seen in FIG. 7, power is supplied by a front-end, front-drive unit 46 made up of engine, clutch, change-speed transmission and differential, all in a composite housing (as in the Citroen 1½ ton van). The engine components of unit 46 occupies only the central lower compartment 47 of front trunk 48, opposite side compartments 49, 50 of which, as well as central upper compartment 51, provide a large amount of auxiliary space for storage and other purposes. It should be noted that compartments 47, 49, 50 and 51 lie outside the passenger compartment and are separated by bulkheads 48' from it, and are thus interposed between the driver and the other three front seat passengers to serve as a protective buffer in taking the brunt of a collision. Front trunk 48 is balanced by a rear trunk 52 having a number of compartments accessible both from outside and inside body 38, compartment 53 having sliding door 54 opening into toilet C housing lavatory 55 above and toilet stool 56 behind one rear wheel; and trunk 52 having another compartment 57 extending into windowseat 58 having a hinged cover. Bulkhead 59 separates compartment 57 from space D which may have bed 60 above the other rear wheel with storage below the bed and shelves above the bed one holding retractible television set 61 shown pulled out to a position where all six rearward-facing passengers in seats 20' and 21' may see its face. The length of bed 60: i.e., whether for children or adults, will depend on how far behind and under rearview window 17' back trunk 52 extends.

As seen in FIG. 7, along much of the left-hand wall of the passenger compartment between driver's seat 19' and toilet C is dresser 22' having worktop 37', sink 36', refrigerator 62, four burner cookstove 35' and oven 63. Space heater 64 has exhaust pipe 65 serving as heat-exchanger in duct 4' on its way to chimney 66 in body top 38, ahead of baggage rack 67. In place of roofcomb 6 of FIG. 1, a pair of horizontal ducts 68, 69, seen in FIG. 12, extend fore and aft from duct 4' and have outer adjustable shutters 70, 71 either of which may be opened to scoop outside air into system of ducts 4', 68, 69 or to expel inside air from the duct system and body 1'. Shutter 70 may be scooping exterior air into the duct system while shutter 71 is expelling interior air from the system, or both shutters 70, 71 may be scooping air into or expelling air from the body simultaneously.

Placing floor 45 for driver and passengers in space B one or more risers above floor 43 and space A serves a number of purposes. (1) It greatly increases storage, since floor 43 extends under floor 45. (2) It greatly insulates floor 45. (3) It provides full standing height in area A alongside the facilities where housekeeping work is to be done. (4) It permits all glazed areas to be lined up at the heights above floors 43 and 45 right for standing or sitting posture. (5) It permits seats 19' and 20' to be mounted in the same vertical plane as the axes of the fore roadwheels. (6) It permits these seats to be adjusted as to position fore and aft on slides 72 exactly as are the seats in FIGS. 3 and 4. While the suspension systems for the tour cars of FIGS. 1 and 5 are not shown, the backbone member 73 of FIG. 13 may house torsion elements for the front wheels while rear roadwheels 10 are suspended on leaf springs 74 mounted on drop-axle 75, or alternately axle 16. In the space between floors 43 and 45 may be housed tanks 76 holding gasoline for the engine of unit 46, fuel oil for space heater 64, and water for sink 36', lavatory 55 and stool 56. As seen in FIG. 7, wastes from sink and lavatory pass by gravity flow to wastes storage tank 78 where hand-pump 77 is used to forcibly flush stool 56 into outlet 79 extending through bottom of body 1'. Front doors 80 give access to one step or more rising to floor 45.

It will be noted that features of body 1' which are similar to those of body 1 are indicated by the same numeral with a prime (') added. The components of the domestic ensemble most closely identical in both bodies 1 and 1' are those of the dinette, seating and sleeping units shown in FIGS. 8–11 and 14–17. FIG. 8 shows essentially the same seating as FIG. 3 but tabletop 29 has been demounted and turned over so that the soft underside 81 of tabletop 29 of FIG. 3 becomes in FIG. 8 the upholstered fill-in 81a in the gap fore and aft between seats 20 and 21 and supported on floor by leaves 30. Thus, with no manipulation of the dinette seats themselves, a berth 82 is formed. Taken together, berth 82 and bed 24 can provide station wagon body 1 with means of prone relaxation for a father, mother and two children—which is the present size of the average American family. If the family is larger and more passengers are to sleep in the car while berth 82 and bed 25 in body 1 are occupied, then berth 82 is made part and the support of the upper parts of double-decker sleeping unit 83 shown in various forms in FIGS. 9–11. By such means, a stock station wagon is made to provide horizontal repose for as many as six passengers separate from and independent of the driver in the one passenger compartment, a development not contemplated by prior art, much less made three-dimensional therein.

In FIG. 3, each seat 20 and 21 has a bottom cushion 84 supported by the hollow and accessible base portion 85 having for floor supports adjustable slides 72 which, within a limited fore and aft space, make it possible to provide foot and leg room both ahead of and behind seats 20 and 21, depending on whether the seats are occupied in rearward-facing or forward-facing position. Dresser 22 is interiorly subdivided into specialized compartments 86 and may receive hard and soft components of sleeping unit 83 to be described. Bedding may also be stored in storage enclosures 85. The resiliency of seats 20 and 21 may be wholly dependent on coil springs and sponge rubber within bottom cushions 84 and back cushions 87. This internal structure is not shown but is mentioned to differentiate seats 19, 20 and 21 as being interiorly sprung in contrast to those which are externally sprung in FIG. 9.

The Human Performance Laboratory of the University of California states: "Seating in most new car models sacrifices long-term comfort and safety for sales appeal." Now that we North Americans have become the most mobile peoples on earth, it would seem that car seating might be devised with passenger comfort primarily in mind. Fatigue, inevitable where a passenger's muscles have to be held for a long period in one unalterable position, can be eased by seating which, either when forward-facing or rearward-facing, may be adjusted to change both the inclinations of the bottom and back cushions of the seat relative to one another and to the floor. Seats 19, 20 and 21, as well as seats 19', 20' and 21', may be made adjustable in various ways. FIG. 16 shows a slotted member 88 in cross section housing head 89 of bolt 90 having shank 91 threaded to receive wingnut 92. Loosen wingnut 92 and bolt 90 may be slid in slot 93. Tighten wingnut 92 and anything caught by shank 91 will be secured at a specific point. In FIG. 8, seat 20 has two such members 88 along either side and secured to the seat to be concentric with the top fore and aft contours of bottom cushion 84. Back cushion 87 has legs 94 extending down alongside members 88 where they are pierced by shanks 91 of bolts 90 having their heads 89 housed in slotted members 88. Short control arms 95 have lengthwise slots 96 through which shanks 91 pass and upper ends of control arms 95 are pivotally secured to legs 94. With the wingnuts 92 loosened, seatback 87 may be shifted across the full width of seat bottom 84 from forward-facing to rearward-facing or vice-versa and the inclination of seat-back may be altered within wide limits. In FIG. 8, however, the inclination of the bottom cushion 84 is not alterable.

The opposite is the case in the seats of FIG. 9 where each of seats 97 has an adjustable back cushion or seatback 87' and bottom cushion 84' and the back and bottom cushions of seat 97 are sprung externally as a unit. The structure permits back cushion 87' to be swung to be horizontal with floor 8 or floor 45 and all adjustments may be made in transit. Bottom cushion 84' is suspended between a pair of opposite end supports 98 having cloverleaf form and having bottom ends secured to seat slides 72. Fixed to central loops 99 of end supports 98 are disks 100 pierced by threaded fasteners 101 and having radial graduations 102 made up of grooves and ridges. Similar disks turn on the same fasteners 101 but on tightening fasteners 101 as with wingnuts 92 the contiguous disks nest and are caught together. One of the nested disks 100 is fixed to one end of bottom cushion 84' and another disk to the opposite end thereof and when fasteners 101 are loosened, the inclination of bottom cushion 84' relative to floor 8 or 45 may be changed before fasteners 101 are tightened to hold bottom cushion 84' in the changed position. The inclination of back cushion 87' may be altered also. The upper ends of main support arms 103 are pivotally secured to intermediate opposite end parts of frame member 104 in back cushion 87' while the lower ends of arms 103 are secured to disks 100. Slots 105 in arms 103 support adjusting prongs 106 at one end of short adjusting links 107 which, at the opposite ends, have pivotal mountings on frame member 104. By loosening prongs 106, the inclination of back cushion 87' may be shifted before refastening prongs 106 in slots 105 as with wingnuts 92. The cloverleaf shape of end supports 98 provides fore and aft spring loops 108 which resiliently resist vertical displacements of occupied seat 97 in rough transit and also resist the leverage of the occupant's body against back cushion 87 either in forward-facing or rearward-facing position. These spring loops 108 are adjacent to the four corners of the lower berth made up as shown in the FIGS. 8 and 9 and 10 by turning tabletop 29, or 29', soft-side up to fill the gap between the bottom cushions of face-to-face seats, as described above. It will be understood that the dinette-convertible-to-berth structure shown in FIG. 3 is present in the FIG. 6 structure as may be seen from FIG. 12, and that the various seat and berth structures shown in FIGS. 8–11 and 14–17 are intended to be equally applicable to the bodies of FIGS. 1 and 5. It will also be understood that seats 20 and 21 for two passengers each and seats 20' and 21' for three passengers each together with tabletops 29 and 29' are dinette components even though seat 20 or 20' may be forward-facing temporarily and seat 21 or 21' temporarily rearward-facing; also, that the same seats and tabletops are components of a berth or sleeping unit such as are being described. No claims are being made herein to the seating per se. The dinette and berth components shown herein are understood to give greater detail of the structure of the like components making up FIGS. 3 and 6 and secured to floors 8 and 45 respectively.

FIGS. 2, 3, 4, 6, 9, 10, 11, 12, 17 and 18 all show berths of divers structure. FIG. 9 shows that spring loops 108 spring upper ends of upper berth 109 of double-decker sleeping unit 83, differing in this respect from the upper berth shown in my Pat. No. 2,638,374. The lower berth of sleeping unit 83 has resilient bottom members 110 slipped over drop-leaves 30 to increase the lower berth resilience. The simplest of the berth structures is berth 24 of FIG. 3 which consists principally of spaced resilient bottom slats 111, as of hickory, bridging the gap between cabinets 26 and joined together by crossties 112. This berth will resiliently support an inflatable rubber mattress 24. Berth 109 has a bottom of heavy canvas 114 caught through slots 115 of peripheral sectional tubular frame 116 and prevented from being pulled through sides of slots 115 by greatly thickened margins 117 of bottom 114 as seen in FIG. 17. Short lengths 118 of frame 116 are secured together by end fittings 119 and side fittings 120 supporting spreaders 121 that extend at some distance below canvas bottom 114. End fittings 119 are secured to frame members 104 demountably and braces 122, secured at one end to nested disks 100 and at the opposite ends to intermediate side fittings 120, effectively transfer weight superimposed on canvas 114 and frame 116 directly to spring loops 108 so that all four corners of rectangular frame 116 are individually externally sprung in rough transit, a feature apparently new in the art.

In FIG. 10, berth 123 has for a bottom a sheet of resilient plywood 124 opposite ends of which are caught into fittings 125 which slip over the tops of face-to-face back cushions 87 or 87'. A row of coil springs 126 is supported by spring-holder 127 and tension wires 128 under the center transverse axis of sheet 124 tend to resist resiliently load imposed on sheet 124 in rough transit. In FIG. 11, berth 129 comprises bed platform 130 supporting a resilient air mattress 131, or foam-rubber pad, supported by rigidly braced carrier 132 which extends between opposite ends and opposite sides of platform 130 and mounted to slide up and down in components of the sidewall of the body. As seen in FIG. 18, carrier 132 is attached to piston 133 operative in hydraulic cylinder 134 having pipe 135 connected with hydraulic fluid storage tank 136. Means forcing fluid into cylinder 134 and push-button controls causing the piston to move in cylinder 134 are not shown as being old in the art. Pressure of fluid in cylinder below piston 133 forces piston upwardly, carrying the bed up close to the substantially flat ceiling where it is secured by hooks 137. Berth 129 fully made up is thus stored out of sight where it is ventilated by ventilator 138 in the side of body 1' as seen in FIG. 5. In its upwardly retracted position, the underside of berth 129 becomes the ceiling of the dinette made up of face-to-face seats 20' and 21' and tabletop 29'. When it is desired to use made-up berth 129, which may be as much as full bed size: 48–54 inches wide and 74–78 inches long, hooks 137 at opposite ends of platform 130 are released and weight of bed forces piston 133 down in cylinder 134 and fluid therein returns to tank 136 till platform 130 comes to rest on seat-backs 87' of seats 20' and 21' as seen in FIG. 11.

FIG. 14 shows an even more adjustable form of seat 139 without, however, any external springing. It should be pointed out that it matters little how much comfort the motorist could be insured with better design. The matter of cost is all-important and the tendency of the motorcar makers is to use the cheapest type of seating possible in the belief that shine will make up for every other deficiency. Nonetheless, as public leisure increases with automation, and travel by car becomes an increasingly common pastime rather than a luxury of the few, travel comfort will become a more important consideration. In seat 139, end supports 140 are made up of concentric slotted members 88 and disks 100 control the inclination of the seat bottom 84' as described. Slotted member or plate 141 is secured to backs of grooved pair 88 and in slot of plate 141 nested disks 100 may be slightly raised or lowered whereby opposite ends of bottom cushion 84 or 84' may be raised or lowered relative to the floor supporting the seat. Slot 142 in each leg 94' permits back cushion 87' also to be raised or lowered relative to the floor and short control arm 107 is manipulated to alter the inclination of back cushion 87' as described in FIG. 9.

FIG. 15 shows another form of seating where seat 143 is positioned directly above a wheelwell like seat 19' over wheelwell 144, seat 143 being mounted on slides 72 for fore and aft change of position to better adapt the driver to driving controls. Still another form of seating is shown in my co-pending application Family Car Ensembles filed Nov. 15, 1961, and now Patent No. 3,097,876, which permits sidewise adjustment of seats 20 and 20' and their quick removal from the car.

One of rear wheelwells 144 extends under lavatory 55 and the opposite rear wheelwell and a substantial storage space extend under bed 60. Floor 45 ahead of forewells 144 extends wholly across the body, step 2a extending under floor 45. Floor 43 also extends wholly across the body except for a possible upward protrusion of tunnel 14' where the engine at the front end of the body 1' is connected with rear axle as in FIG. 2. As in Patent No. 3,058,769, the power-drive unit may be at the back end of the body and space 57 of FIG. 6 could house such a unit. With the structure of seats 20 and 21 and 20' and 21' permitting the seat-backs to be reversible, it should be particularly pointed out that accidents and death on the highway frequently result from passengers being pitched violently forward in collisions. In the tour cars described, means is provided for all passengers except the driver to sit rearward-facing in times of particularly dangerous traffic. Under such conditions, the seat-backs can effectively resist the tendency of forward-facing passengers to be dashed against the instrument panel or through the windshield. Even without seat-belts, the rearward-facing seat-backs offer protection to the full length of the passengers' spines. Because the seat-backs of the front seats 20 and 20', when rearward-facing, cover the space commonly utilized for the car heater and electric audio means of entertainment, these have been placed elsewhere. Since a TV set at the level of the instrument panel could not be seen by back-seat passengers and is too close to front seat passengers, my tour car positions a TV set rearward of and above the backward-facing passengers and it will be understood that set 61 may be a radio, record player or other audio means of entertainment and that space heater 64 may also be utilized between seat 19 and dresser 22 in FIG. 2 and have an exhaust pipe carry the fumes of combustion from the body as in body 1'.

What the tour car of FIGS. 5–7 may be said to comprise is an automotive efficiency housekeeping apartment. It should be noted that either body 1 or 1' seats six passengers at one table at the same time and that in both bodies a bed extending ahead of, as well as behind a vertical plane through the axes of the aftwheels, tops a substantial storage space. In both bodies, not less than two passengers sit spaced in the lengthwise center axis of the body. FIG. 6 shows means of seating three passengers spaced fore and aft in this axis. Both bodies, by meeting biological mobile needs by simpler means and requiring less space for greater accommodations than shown in prior art, are intended to stem present trends toward making the family car more luxuriously pretentious but at the same time less useful. An example of this is permitting the increasing protrusion of the driveshaft tunnel in low-slung cars to rob cars of passengers: the formerly 6-passenger car shrinking its seating accommodations down from six to five, to four in the present craze to make the car resemble in silhouette a lizard or speedway racer.

The drawings, being illustrative only, are more or less diagrammatic in character to show the preferred relation of the parts of an ensemble, and it will be understood that changes may be made in the various parts without vitally altering the character of the whole or departing from the spirit and scope of the invention as set forth in the appended claims; and all changes which come within the meaning and range of equivalency of the claims are therefore intended to be embraced therein.

Having thus broadly defined and fully described my invention, its domestic character and versatile structure in conversion to many uses both in transit and when parked, what I claim and desire to secure by Letters Patent of the United States is:

1. A family car comprising an automotive body on forewheels and aftwheels and housing in one and the same compartment driving controls and a driving seat facing said controls and dinette components seating two passengers face-to-face in the longitudinal center axis of the body directly above a floor having two margins that meet at a corner, and a passage extending around said corner to reach a sidedoor slightly ahead of an aftwheel, and said body extending down from said margins to the bottom of said passage to wall said passage below said floor.

2. A family car comprising an automotive body on forewheels and aftwheels and having on one side of the body a foredoor next to and ahead of a forewheel and an aftdoor next to and ahead of an aftwheel, said doors opening on floors of different levels in the passenger compartment, the floor of higher level extending from one side to the opposite side of the body ahead of the forewheels and rearwardly to the aftdoor more on one side than on the opposite side of the longitudinal center axis of the body, and the floor of lower level extending from said aftdoor to the opposite side of the body and forwardly along that side, a driving seat facing driving controls separate from dinette components seating a minimum of four passengers above the higher floor and said lower floor supporting housekeeping components including a dresser and worktop and a passage extending between said dresser and said dinette and angling to reach the aftdoor behind said dinette.

3. A family car having an automotive body on forewheels and aftwheels and housing in a passenger compartment a driving seat facing driving controls and a dinette seating a minimum of four passengers, a sidedoor between said dinette and an aftwheel and opening on a passage that extends around a corner made by two margins of a floor supporting seating components of said dinette, the bottom of said passage comprising a lower floor extending in spaced relation under the first-named floor, the two floors walling a storage enclosure that extends under said dinette.

4. A family car having an automobile body on fore and aft roadwheels and doors on one side ahead of the aftwheels and giving entrance to a passenger compartment floored at substantially different levels and housing a domestic ensemble comprising a driving seat at driving controls below a transparent windshield, and a dresser with side opening-closures and a worktop, and components of a sleeping unit convertible to form a dinette, and other horizontal means of repose behind said components which include a demountable dinette tabletop and a pair of temporarily face-to-face dinette seats extending along opposite sides of the tabletop from one sidewall of the body to and well beyond the longitudinal center axis of the body to a passage on a floor of lower level leading to the aft one of said doors, said dresser being on said lower level and right across said passage from one of said dinette seats, and said passage giving access to a storage enclosure walled by a floor of higher level.

5. The structure of claim 4 wherein said windshield extends ahead of said forewheels and said horizontal means of repose comprises a bed topping a storage enclosure extending behind the aftwheels and above a floor of higher level.

6. The structure of claim 4 wherein said windshield extends behind the forewheels and said horizontal means of repose comprises a berth topping a storage enclosure that extends above and behind the aftwheels, and on a floor of higher level.

7. The structure of claim 4 wherein said sleeping unit components include upwardly diverging back cushions of said face-to-face dinette seats, the back cushions having integral frames and receiving thereon and therebetween the horizontal framework of rectilinearly extending elements, said framework supporting the softer portion of an upper berth.

8. A family car having on forewheels and aftwheels an automobile body enclosing a passenger compartment that extends behind the aftwheels and is bottomed by floors of substantially different levels and has a transverse wall extending a full step up from a floor of lower level ahead of the aftwheels to a floor of higher level for the back end of the compartment, a sidedoor closely ahead of said transverse wall opening on said lower floor, and the compartment ahead of said wall housing an ensemble comprising a driving seat facing driving controls and a dresser on said lower floor and having drawers and a worktop, and several dinette components extending from one side of the body to and well beyond the longitudinal center axis of the body, one of said components being a tabletop bordering a passage leading to said sidedoor, the dresser being right across said passage from a dinette component and said compartment behind said transverse wall housing a number of storage enclosures on said higher floor, one or more of said enclosures extending behind the aftwheels.

9. A family car having an automobile body on roadwheels mounted to rotate in wheelwells fore and aft, the body enclosing a passenger compartment entered by doors spaced on one side of the body and opening on floors of different levels, said compartment housing an ensemble comprising a pair of temporarily face-to-face dinette seating components extending along opposite sides of a dinette tabletop from one side of the body to and beyond the longitudinal center axis thereof and to a passage along a floor of lower level leading to the aft one of said doors, and a driving seat separate from said dinette components and facing driving controls below a transparent windshield, the forward of said dinette seating components having a bottom cushion extending over a forewell and in the same transverse vertical plane as said driving seat and the axes of the forewheels.

10. A family car having an automobile body on roadwheels in wheelwells fore and aft, the body enclosing a passenger compartment entered by doors of which one opens on a lower floor that is a step down from a higher floor between and behind the aftwells, said compartment housing a driving seat on a forewell and in the same transverse vertical plane as the forewheel axes and a dinette separate from the driving seat and made up of a pair of seats each having a bottom cushion extending from one side of the body to and substantially across the longitudinal center axis of the body on opposite sides of a demountable tabletop and to a transversely off-center fore and aft passage, and a group of housekeeping components including a storage cabinet having a number of side opening closures below a worktop right across said passage from said tabletop, said passage leading along the lower of said floors to the aft one of said doors.

11. A family car having an automobile body on fore and aft roadwheels and enclosing a passenger compartment entered by spaced doors on one side of the body and opening on floors of different levels extending right across the body, said compartment seating a minimum of five passengers including a driver facing controls above a floor of higher level, and said compartment housing non-seating components of a housekeeping ensemble including a dresser over a floor of lower level and right across a passage from a dinette tabletop set up to extend from one side of the body to and beyond the longitudinal center axis thereof, said passage giving access to a floor of higher level across the backend of the compartment, and said passage extending along said floor of lower level and having to pass right through a gap between fore and aft floors of higher level to reach the aft one of said doors.

12. A family car having an automobile body on roadwheels in wheelwells fore and aft, the body enclosing a passenger compartment enterable by doors on opposite sides of the body and including one door closely ahead of an aftwell and opening on a passage a step down from the topside of the body bottom between and behind the aftwells and a second door giving access to a floor ahead of the forewells and behind an inner bulkhead that extends from one side to the opposite side of the body to wall a number of collision-buffering enclosures forwardly bulging below a transparent windshield, driving controls above said floor and a driving seat next to said second door and facing said controls, and said passage giving access to a storage enclosure on said topside and to a pair of seats each seating one occupant next to one side of the body and another occupant in and on opposite sides of the longitudinal center axis of the body, and all said occupants temporarily rearward-facing.

13. A family car having an automobile body on forewheels and aftwheels and enclosing a passenger compartment entered by doors on one side of the body and that include a foredoor closely behind a transparent windshield and an aftdoor closely ahead of an aftwheel and opening on a lower floor that is a step down from a higher floor extending behind the aftwheels in spaced relation with, and directly below, a horizontal means of repose, the lower floor supporting a dresser having a worktop right across a passage from dinette components that comprise a tabletop extending along and over a passenger seat bottom cushion from one side of the body to and substantially beyond the longitudinal center axis of the body, and a driving seat accessible from said foredoor and fixedly facing driving controls, both said driving seat and said foredoor being in the same transverse vertical plane as the forewheel axes.

References Cited by the Examiner
UNITED STATES PATENTS

| | | | |
|---|---|---|---|
| 1,163,056 | 12/15 | Zimmerman | 296—23 |
| 1,392,955 | 10/21 | Martin | 296—23 |
| 1,397,594 | 11/21 | Moses. | |
| 1,485,550 | 3/24 | Bland | 296—23 |
| 1,754,086 | 4/30 | Feilcke. | |
| 2,232,353 | 2/41 | Votypka | 296—24 |
| 2,638,374 | 5/53 | Willson | 296—23 |
| 3,021,171 | 2/62 | Barenyi | 296—37 X |
| 3,058,769 | 10/62 | Willson | 296—23 |

OTHER REFERENCES

"Evangelist's Traveling Car," from "Motor Vehicle Monthly," December 1924, vol. 60, No. 9, pages 25, 68 and 69.

"A 'Motorlounge,'" from "The Autocar" magazine, Dec. 18, 1936; pages 1212 and 1213.

"New 'Land Yacht' Will Go Places," from "Ford Field" magazine, January 1950; pages 22, 42 and 43.

"Design for Custom Built House Car Body for a Forward Drive Chassis," from "Autobody and the Reconditioned Car" magazine, May 1950; pages 8 and 71.

"Sleeping Car Comforts for Ford Tourists," in "Ford Field" of May 1951; page 18.

"New Dormobile Caravan," in "The Autocar" of Oct. 11, 1957, pages 543 and 544.

"Self Propelled Caravans," from "The Autocar" magazine, Oct. 31, 1958; page 723.

A. HARRY LEVY, *Primary Examiner.*

PHILIP ARNOLD, *Examiner.*